US007918058B2

(12) United States Patent
Debailleul et al.

(10) Patent No.: US 7,918,058 B2
(45) Date of Patent: Apr. 5, 2011

(54) DEVICE FOR FIXING AN ORNAMENTAL PROFILED SECTION ON A SHAPED BAND

(75) Inventors: Romain Debailleul, Margny-les-Compiegne (FR); Gerard Huchet, Autreches (FR); Renaud Subra, Dubendorf (CH)

(73) Assignee: Saint-Gobain Glass France, Courbevoie (FR)

( * ) Notice: Subject to any disclaimer, the term of this patent is extended or adjusted under 35 U.S.C. 154(b) by 485 days.

(21) Appl. No.: 11/915,396

(22) PCT Filed: May 24, 2006

(86) PCT No.: PCT/FR2006/050479
§ 371 (c)(1),
(2), (4) Date: Apr. 21, 2008

(87) PCT Pub. No.: WO2007/003823
PCT Pub. Date: Jan. 11, 2007

(65) Prior Publication Data
US 2008/0196353 A1 Aug. 21, 2008

(30) Foreign Application Priority Data
May 26, 2005 (FR) .................................. 05 51382

(51) Int. Cl.
*B60J 10/02* (2006.01)
*B60J 10/00* (2006.01)
*E06B 7/16* (2006.01)
*E06B 7/00* (2006.01)

(52) U.S. Cl. ........... 52/204.53; 52/204.591; 52/204.597; 52/208; 296/93; 296/146.15

(58) Field of Classification Search ............. 52/204.591, 52/204.597, 204.53, 208, 716.5, 716.6, 716.7; 296/93, 146.15
See application file for complete search history.

(56) References Cited

U.S. PATENT DOCUMENTS

| 2,761,535 | A | * | 9/1956 | Englehart | ................ 52/204.597 |
| 2,793,071 | A | * | 5/1957 | Meyer | ........................... 296/200 |
| 3,241,281 | A | * | 3/1966 | Hall | ........................ 52/204.597 |
| 3,968,613 | A | | 7/1976 | Meyer | |
| 4,197,688 | A | * | 4/1980 | Mauer | ............................. 24/292 |
| 4,278,286 | A | * | 7/1981 | Kiba et al. | ...................... 296/93 |
| 4,349,993 | A | * | 9/1982 | Tanaka et al. | .................. 52/208 |
| 4,984,839 | A | * | 1/1991 | Miyakawa et al. | ............. 296/93 |

(Continued)

FOREIGN PATENT DOCUMENTS
EP 0 258 128 3/1988
(Continued)

*Primary Examiner* — Robert J Canfield
(74) *Attorney, Agent, or Firm* — Oblon, Spivak, McClelland, Maier & Neustadt, L.L.P.

(57) ABSTRACT

A device for attaching a profiled trim to a portion of a shaped bead mounted on a glazing, for example mounted on at least part of the periphery of a glazing. The device includes at least one rigid clip including at least an upstream interacting part configured to allow interaction with the shaped bead and a downstream interacting part configured to allow interaction with the profiled trim. The upstream interacting part includes at least one protruding male element or a hollow female element, this element interacting respectively with a corresponding hollow female element or a protruding male element arranged in the shaped bead. The hollow female element has internal dimensions at least partially less than external dimensions of the protruding male element.

14 Claims, 5 Drawing Sheets

U.S. PATENT DOCUMENTS 5,035,096 A * 7/1991 Ohtake et al. .................. 52/208
5,078,444 A * 1/1992 Shirahata et al. ............... 296/93
5,088,787 A    2/1992 Gross

FOREIGN PATENT DOCUMENTS

| | | |
|---|---|---|
| FR | 2 340 217 | 9/1977 |
| GB | 1 230 894 | 5/1971 |
| GB | 2 168 741 A * | 6/1986 |
| JP | 4-252728 * | 9/1992 |
| WO | 94 16186 | 7/1994 |
| WO | 99 55547 | 11/1999 |
| WO | 2005 033526 | 4/2005 |
| WO | 2007/003823 A2 * | 1/2007 |

\* cited by examiner

DEVICE FOR FIXING AN ORNAMENTAL PROFILED SECTION ON A SHAPED BAND

The present invention relates to the field of producing shaped beads on glazing units.

The present invention relates more particularly to a device for attaching a profiled trim to a portion of a shaped bead mounted on a glazing and in particular mounted on at least part of the periphery of a glazing, and particularly of a vehicle glazing.

The purpose of a profiled trim is to make it possible to mask at least a part of a shaped bead and thus to modify the general aspect thereof. A profiled trim usually consists of a strip made of metal or of any other material that has a different appearance from that of the shaped bead and may for example have a metallic look, shiny or matte, or else be painted.

The device for attaching the profiled trim according to the invention is of the type comprising at least one clip having at least an upstream interacting part designed to allow interaction with said shaped bead and a downstream interacting part designed to allow interaction with said profiled trim.

The "upstream interacting part" refers to the means that make it possible to attach the clip to the shaped bead. Normally, these means are used first; that is why they are qualified as "upstream" means. The "downstream interacting part" refers, for its part, to the means that make it possible to attach the profiled trim to the clip and that are therefore usually used after the upstream means. When the clip is incorporated into the profiled trim for example, this rule does not apply, but the naming is retained all the same.

Thus this (or these) clip(s) has (or have) the purpose of making it possible to removably attach the profiled trim to the shaped bead and consequently to the glazing.

This attachment must be sufficiently strong for the profiled trim to remain held in place in normal times and particularly in the case of a vehicle glazing during the operation of the vehicle, but this attachment does not however have to be definitive in order to allow, as necessary and particularly during a replacement of the glazing, access to the shaped bead part which the profiled trim masks in normal times.

Such an attachment device is known in the prior art for example from French patent application No. FR 2 340 217. In this document, the upstream part is, in section, generally L-shaped and the curved end of this L shape is inserted into a wide opening arranged in the shaped bead and opening either side of the shaped bead. The straight part of the L shape is designed to come against the edge of the glazing and the curved end is designed to come against the inner face of the glazing. Lugs are also provided on the clip to come to interact with the outer face of the glazing.

According to this prior art, the clip or clips and the profiled trim can be installed only at the same time as the attachment of the shaped bead because the curved end comes against the inner face of the glazing. This device can therefore be used only with a fitted shaped bead.

This device can therefore not be used when the shaped bead is manufactured by direct molding onto the glazing according to the well-known technique of encapsulation nor when the shaped bead is manufactured by direct extrusion of the material on the surface of the glazing.

Furthermore, this device is difficult to use when the glazing is curved. Specifically, the current industrial techniques of bending do not make it possible to obtain glazing units that are absolutely perfectly all identical.

Because of the direct interaction between the clip and the glazing, if the glazing, although being acceptable due to the manufacturing tolerances, does not have the nominal dimension, for example if it is slightly thinner or on the contrary slightly thicker at the place provided for the interaction with the clip, then, the clipping is difficult to achieve. Then the profiled trim may also not be precisely against the outer surface of the shaped bead and the esthetic effect is then deplorable.

In addition, because a part of the clip is trapped between the glazing and the bead of adhesive bonding the glazing into the window recess of the bodywork, it is not possible to carry out only a replacement of the clip if the latter is damaged for example. If a clip is damaged, the whole glazing has to be changed.

Finally, mounting is particularly tricky because it is necessary at the same time to clip the clip so that the lugs interact with the inner and outer faces of the glazing and at the same time ensure that the fitted shaped bead is correctly positioned. Such an operation can be carried out only manually and, despite the dexterity of the operators, it cannot lead to a perfectly even esthetic effect over the whole periphery of the glazing and over all the glazings.

Furthermore, the prior art knows of international patent application No. WO 2005/033526 which relates to a system of clipping a profiled trim for an shaped bead using a flexible clip having a first simple boss designed to be inserted into a first simple groove of the shaped bead and a second more complex boss, in the shape of a hook, designed to be inserted into a groove that is also more complex of the shaped bead by deformation of the flexible clip. The clip is thus hooked onto the shaped bead. A pinching effect of the shaped bead is furthermore obtained by producing a slightly shorter distance between the two bosses of the clip than between the two grooves of the shaped bead.

For the attachment of the profiled trim, the profiled trim is first inserted into a boss of the clip, then the clip is again deformed to make it possible to pass the profiled trim over a protrusion of the shaped bead.

Now, this deformation is exactly contrary to the deformation that has made it possible to hook the clip to the shaped bead.

Once assembly is completed, the flexible clip is thus permanently subjected to opposing tensions which tend both to hold the clip hooked to the shaped bead and to keep the profiled trim clipped to the clip.

This system is not satisfactory because the vibrations perceived at the shaped bead during the operation of the vehicle, particularly on a bumpy road, cause deformations of the seal which may cause an unhooking of the flexible clip under permanent tension and consequently may cause the loss of the profiled trim.

The object of the invention is to alleviate the disadvantages of the prior art by proposing a system for attaching a profiled trim that is reliable and makes it possible to hold the profiled trim including in extreme conditions particularly of vibration, that is easy and cheap to apply and that may also be used irrespective of the technique of attaching the shaped bead that has been chosen.

The present invention therefore relates in its broadest sense to a device for attaching a profiled trim to a portion of an shaped bead mounted on a glazing and in particular on at least part of the periphery of a glazing, said device comprising at least one rigid clip having at least an upstream interacting part designed to allow interaction with said shaped bead and a downstream interacting part designed to allow interaction with said profiled trim, characterized in that said upstream interacting part comprises at least one protruding male element or a hollow female element, this element interacting respectively with a corresponding hollow female element or a protruding male element arranged in the shaped bead, said hollow female element having internal dimensions at least partially less than the external dimensions of said protruding male element.

The upstream interaction according to the invention therefore consists in a fitting of a protruding male element inside a hollow female element of lesser dimension and a holding by contact between respective walls, on the one hand, of the protruding male element and, on the other hand, of the hollow female element. This contact then causes a superficial tension of the surfaces of the two elements in contact which, in a surprising manner, withstands extraordinarily well the vibrations experienced at the attachment when the vehicle is operating.

In a first variable embodiment of the invention, said protruding male element consists of a boss having, in cross section, a trunk and a rounded end.

In this first variant, the protruding male element has preferably, in cross section, a sectional narrowing, in order to further improve the hold of the male element in the female element.

In a second variant embodiment of the invention, the protruding male element has, in cross section, a substantially parallelepipedic shape.

Other variant embodiments of the shape of the protruding male element may also be envisaged.

Irrespective of the shape of the protruding male element, it is possible to produce the hollow female element either on the shaped bead, or on the clip; these are the two possible subvariants.

The hollow female element may then form a hole that opens onto only one face respectively of said shaped bead or of the clip.

In the first of these subvariants, when the hollow female element is made in said shaped bead, the hollow female element forms, preferably, a hole that opens onto only one face of said shaped bead. Irrespective of the technology used to produce the shaped bead, the production of such a hole does not pose any particular difficulties.

In the second of these subvariants, when the hollow female element is made in said clip, the hollow female element forms, preferably, a hole opening on two opposite faces of said clip. The hold of the protruding male element in the hollow female element is therefore slightly less effective, but it may be simpler to produce a slot opening on two opposite faces of the clip than a cavity opening on only one face, in particular when the clip is manufactured by molding.

Irrespective of the variant or subvariant embodiment of the invention, said upstream interacting part also preferably has a curved proximal part designed to come to bear on an inner face of said glazing.

This curved proximal part also, preferably, is, in front view, substantially T-shaped.

In addition, this proximal part may be bonded at least in part to the inner face of said glazing or to the shaped bead, in order to improve the interaction between the clip and the shaped bead attached to the glazing.

Irrespective of the variant or subvariant embodiment of the invention also, said downstream interacting part is preferably, in side view, substantially V-shaped or Y-shaped.

In a particular version, one branch of the V or of the Y terminates in a rounded end and the adjacent branch of the V or of the Y terminates in a triangular or L-shaped end, in order to make the profiled trim easier to mount on the clip.

This rounded end preferably has a diameter that is slightly less than the thickness of the branch and it is positioned offset relative to an axis of symmetry of the branch that supports it.

The triangular end, for its part, preferably has, in section, substantially the shape of an equilateral triangle whose height is approximately three times the thickness of the branch that supports it.

In another particular version, the clip is made of the same material and in one piece with said profiled trim.

The present invention therefore also relates to a profiled trim incorporating at least one clip for this other particular version.

The present invention also relates to a clip for an attachment device according to the invention, said clip having at least one upstream interacting part designed to allow interaction with a shaped bead and a downstream interacting part designed to allow interaction with a profiled trim.

The present invention also relates to a glazing furnished in particular on at least part of its periphery with a shaped bead attached to said glazing, said shaped bead being provided on at least a portion with a profiled trim, said glazing also comprising an attachment device according to the invention.

For this glazing, the protruding male element or the hollow female element is preferably arranged in the part of the shaped bead adjacent to the edge of the glazing.

Advantageously, the attachment device according to the invention may be used both when the shaped bead is encapsulated or extruded onto the glazing and when the shaped bead is bonded to the glazing.

Also advantageously, the clipping of the clip or preferably the clips is extremely simple to achieve; it can even be achieved automatically because the clipping movement of the clip onto the shaped bead is a movement of simple translation, without rotation. The clipping of the profiled trim onto the clip can also be achieved automatically because the necessary movement is also simple.

Also advantageously, the clipping system according to the invention is such that the profiled trim can be removed only by making a plastic deformation of the latter, this deformation rendering it unusable thereafter, in order to prevent the theft of the profiled trim.

The present invention will be better understood on reading the following detailed description of nonlimiting exemplary embodiments of the attached figures.

Note that the proportions between the various elements represented are not rigorously respected in these figures in order to make them easier to understand.

The present invention relates to a device (1) for attaching a profiled trim (2) to a portion of a shaped bead (3) mounted on a glazing (4), and in particular a motor vehicle glazing.

Figure 1:
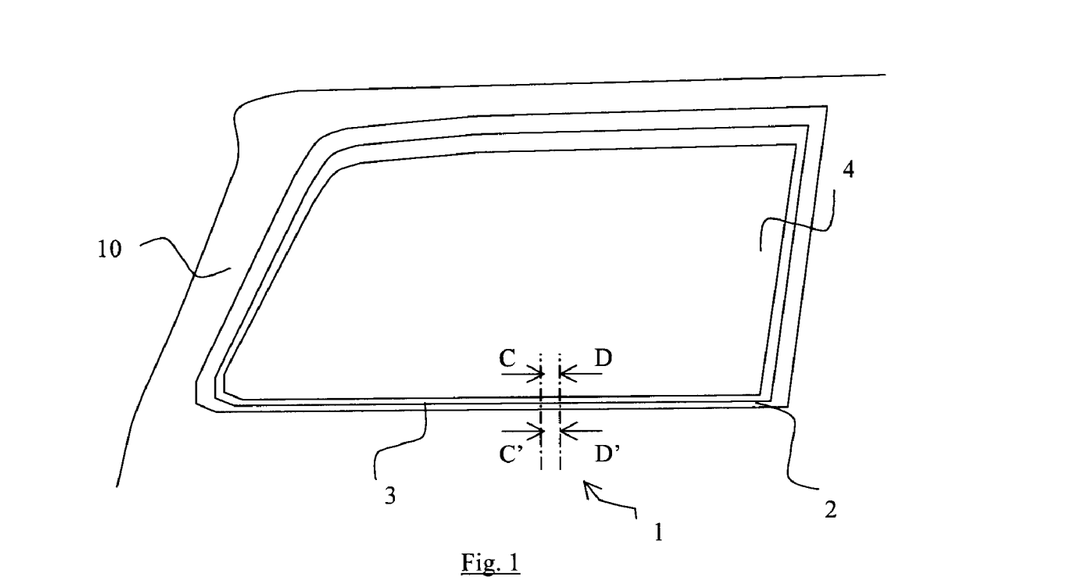
FIG. 1 illustrates a side view of the rear end of a vehicle furnished with a glazing having a profiled trim attached with the aid of an attachment device according to the invention.

FIG. 1 illustrates a rear end of a vehicle fitted with a fixed glazing (4) on the periphery of which a shaped bead (3) has been made of a flexible polymer.

The polymer constituting the shaped bead (3) may be a thermoplastic (PVC, TPE, etc.), a polyurethane or else a synthetic rubber of the EPDM type or any other appropriate material.

The shaped bead (3) has been manufactured by using a manufacturing process called "encapsulation" because it comprises a step of molding the shaped bead (3) in a molding device, between two molding elements, one molding element receiving the inner face of the glazing and a molding element receiving the outer face of the glazing, these two molding elements being closed on one another during the molding step.

In FIG. 1, the shaped bead (3) is placed on the whole periphery of the glazing (4) but this shaped bead could quite possibly be positioned on only a part of the periphery of the glazing or on any part of the glazing.

To improve the esthetic appearance of the glazing, a part of the shaped bead (3) visible from the outside of the vehicle is masked by a profiled trim (2) that is here placed only on a bottom part of the glazing, but that could equally be placed on the whole periphery of the glazing (4) and/or on any part of the glazing.

The glazing (4) may be a one-piece glazing, that is to say consisting of a single sheet of material, or may be a multiple glazing, that is to say consisting of several sheets of material between which at least one layer of adhesive is inserted in the case of laminated glazing, or at least an intermediate space in the case of double-glazing. The sheet or sheets of material may be mineral, particularly made of glass, or organic, particularly made of plastic.

In the case of a glazing for a vehicle, the glazing usually has at least partially on its periphery a strip of ornamentation, not shown here. This strip of ornamentation usually results from an enamel deposit, made on the inner face of the glazing or on an intermediate face of the glazing for composite glazings, but it may also result from a partial and/or peripheral coloring of a sheet of material used, particularly of a sheet made of organic material.

The device (1) according to the invention comprises, for the attachment of the profiled trim (2), at least one clip (5) more rigid than the shaped bead (3), and preferably several clips (5) distributed along the profiled trim (2) along the length of said profiled trim.

Each clip (5) has at least, on the one hand, an upstream interacting part A designed to allow interaction between the clip and said shaped bead (3) and, on the other hand, a downstream interacting part B designed to allow interaction between the clip and said profiled trim (2).

In a version of the invention that is not illustrated here, the clip or clips (5) is or are made of the same material and in one piece with said profiled trim (2). In this version, the interaction between the clip and said profiled trim is therefore achieved via the material forming the single piece: trim incorporating the clip or clips.

In this version of the invention, the single piece may be made of metal or of metal alloy or may be made of plastic. When the single piece is made of plastic, it may be manufactured by molding and covered in its visible part, after the glazing has been mounted, with a paint giving the appearance of a metal.

In all the versions of the invention illustrated here, on the one hand, the profiled trim (2) and, on the other hand, the clip or clips (5) form different pieces that are assembled together only when the profiled trim (2) is mounted against the shaped bead (3) attached beforehand against the bottom edge of the glazing (4).

In all these versions, the upstream interacting part A of the clip is attached to the shaped bead (3) before the profiled trim (2) is attached to the clip thanks to the part B.

The clip is chosen to be of a material having a greater rigidity than that of the shaped bead. The clip may therefore be made of metal or of metal alloy, or else of plastic. It has a plane of symmetry along its length.

According to the invention, the upstream interacting part A comprises at least one protruding male element (6) or a hollow female element (7'), this element interacting respectively with a corresponding hollow female element (7) or a protruding male element (6'), of substantially identical shape, arranged in the shaped bead (3), said hollow female element (7, 7') having internal dimensions at least partially less than the external dimensions of said protruding male element (6, 6').

This interaction is therefore of the "mortice-tenon" type with a friction effect between at least a part of the surfaces of the elements.

The element that is arranged in the shaped bead is, preferably, arranged in the part of the shaped bead (3) adjacent to the edge of the glazing (4). Specifically, in this location, the shaped bead (3) is thinner and therefore has a greater flexibility that promotes the positioning and holding of the, or each, protruding male element in the, or each, hollow female element.

Figure 2:
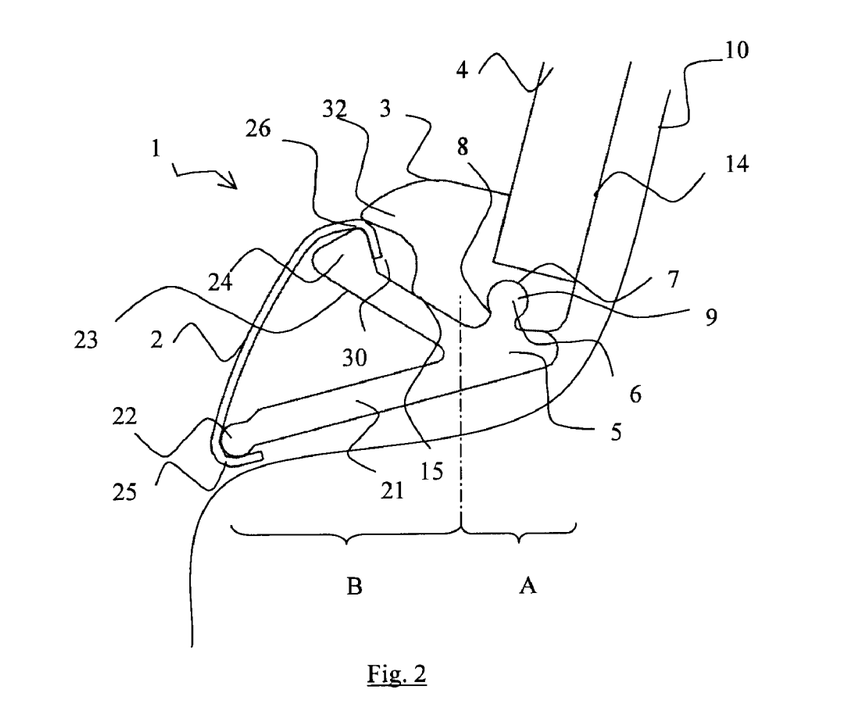
FIG. 2 illustrates a view in section along C-C' of FIG. 1 of a first exemplary embodiment of the invention, for the first variant embodiment with rounded protruding male element, this first example corresponding to a subvariant with protruding male element on the clip.
Figure 3:
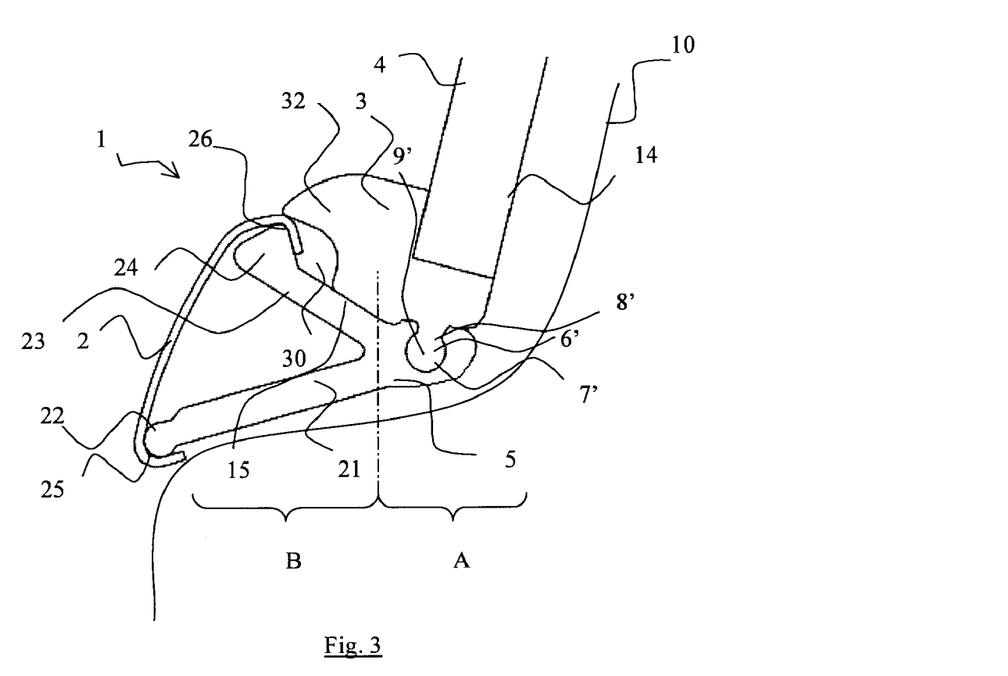
FIG. 3 illustrates a view in section along C-C' of FIG. 1 of a second exemplary embodiment of the invention, for the first variant embodiment with rounded protruding male element, this second example corresponding to a subvariant with hollow female element on the clip and not open-ended.
Figure 4:
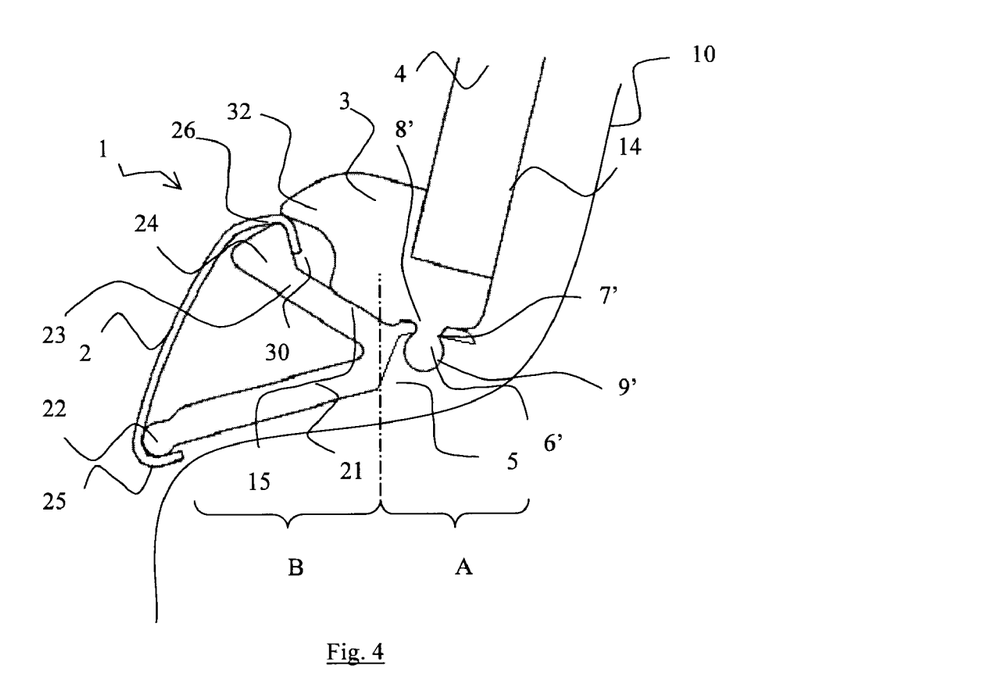
FIG. 4 illustrates a view in section along C-C' of FIG. 1 of a third exemplary embodiment of the invention, for the first variant embodiment of the invention with rounded protruding male element, this third example corresponding to a subvariant with hollow female element on the clip and opening onto opposite faces of the clip.

In a first variant of the invention, illustrated in FIGS. 2 to 4, the protruding male element (6, 6') consists of a boss having, in cross section, a trunk (8, 8') and a rounded end (9, 9'). If the protruding male element (6, 6') extends over several millimeters, the rounded end (9, 9') is then cylindrical; otherwise, the rounded end (9, 9') is then spherical.

In these three figures, the protruding male element (6, 6') has, in cross section, a sectional narrowing.

To do this, either the trunk (8, 8') is narrower than the rounded end (9, 9'), or the section is reduced between the trunk (8, 8') and the rounded end (9, 9').

The hollow female element (7, 7') then has, close to its mouth through which the male element is inserted, a slightly lesser cross section than that of the sectional narrowing.

The fact that the material constituting the clip is more rigid than the material constituting the shaped bead (3) makes it possible to take advantage of the elasticity of the material constituting the shaped bead (3) to allow the rounded end (9) to pass despite the narrowing of the section of the cavity.

EXAMPLE 1

In a first subvariant of the first variant and illustrated in FIG. 2, the protruding male element (6) is situated on the clip (5) and the corresponding hollow female element (7) is situated in the shaped bead (3).

Here, the hollow female element (7) forms a hole that opens onto only one face of the shaped bead (3).

EXAMPLE 2

In a second subvariant of the first variant and illustrated in FIG. 3, the protruding male element (6') is situated on the shaped bead (3) and the corresponding hollow female element (7') is situated in the clip (5).

Here, the hollow female element (7') forms a hole that opens onto only one face of the clip (5).

In these first two subvariants, for a better interaction between the protuberance producing the protruding male element and the cavity producing the hollow female element, the protuberance and consequently also the cavity have a generally identical shape, the only difference being that the cavity is from one to a few tenths of a millimeter smaller in certain dimensions.

EXAMPLE 3

In a third subvariant of the first variant and illustrated in FIG. 4, the protruding male element (6') is also situated on the shaped bead (3) and the corresponding hollow female element (7') is situated in the clip (5), as for the preceding subvariant, but here said hollow female element (7') forms a hole opening onto two opposite faces of the clip (5).

In a second variant of the invention, illustrated in FIGS. 5 to 10, the protruding male element (6, 6') consists of a boss having, in cross section, a substantially parallelepipedic and more precisely rectangular shape.

EXAMPLE 4

Figure 5:
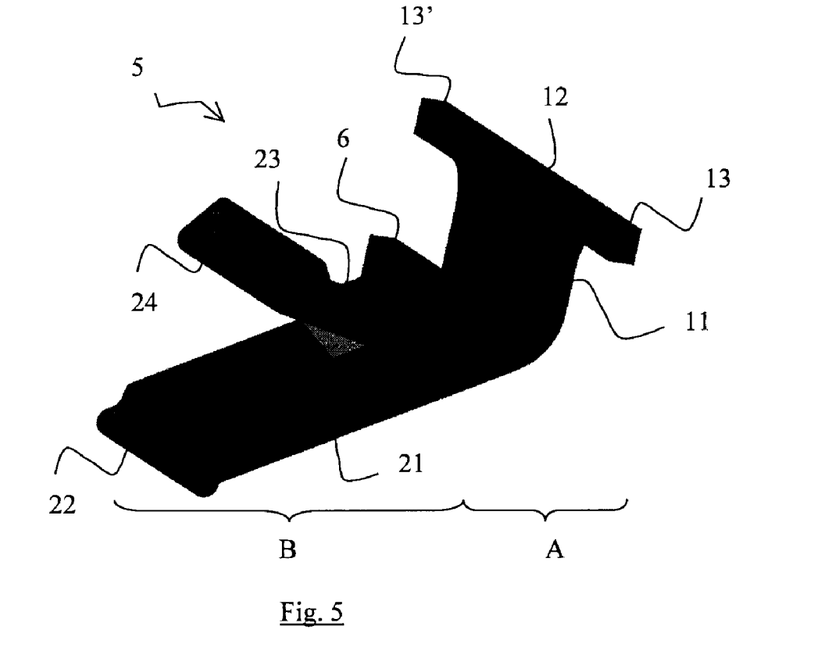
FIG. 5 illustrates a view in elevation of a clip for a fourth exemplary embodiment of the invention, this clip using the second variant embodiment of the invention with protruding male element with flat edges and using a subvariant with protruding male element on the clip and with curved proximal part.

In a first subvariant of the second variant and illustrated in FIG. 5, the protruding male element (6) is situated on the clip (5).

EXAMPLE 5

Figure 6:
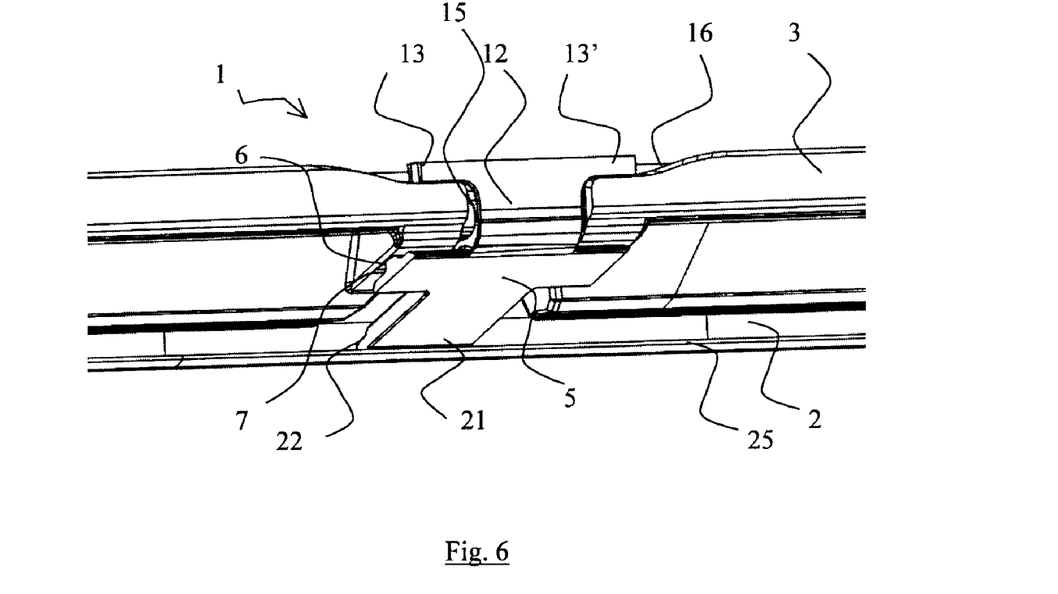
FIG. 6 illustrates an internal view of an example of interaction between a clip, a profiled trim and an shaped bead for a fifth exemplary embodiment of the invention, this clip also using the second variant embodiment of the invention and a subvariant with protruding male element on the clip and with curved proximal part.

In a second subvariant of the second variant and illustrated in FIG. 6, the protruding male element (6) is situated on the clip (5).

In the first subvariant illustrated in FIG. 5, the protruding male element (6) has a width substantially identical to the width of the base of the clip on which it is mounted, while in the second subvariant illustrated in FIG. 6, the protruding male element (6) has a width greater than the width of the base of the clip on which it is mounted, this width being of the order of double the width of the base of the clip.

As can be seen in FIG. 6, the corresponding hollow female element (7) is situated in the shaped bead (3) and forms a hole that opens onto only one face of the shaped bead (3). This hole naturally also has a substantially parallelepipedic and more precisely rectangular shape.

In the second variant, as can be seen in greater detail in FIGS. 5 to 10, the hold obtained by the interaction between the protuberance and the cavity may not be sufficient and it may be preferable to additionally provide that said upstream interacting part A has a curved proximal part (11) designed to come to bear on an inner face (14) of said glazing (4).

The curved proximal part (11) is so named because it is positioned close to the glazing (4).

This curved proximal part (11), although situated in the extension of the base of the clip supporting the upstream interacting part A, is positioned substantially perpendicular to this base, in a corner that is preferably rounded.

As can be seen in particular in FIGS. 5 and 6, the curved proximal part (11) is, in front view, substantially T-shaped furnished with a trunk (12) and two branches (13, 13').

In the case of a glazing for a vehicle having on its periphery a strip of ornamentation, the branches (13, 13') are positioned at least partially under said strip of ornamentation and preferably wholly under this strip, so that they are not visible from outside the vehicle.

It is possible to provide that the proximal part (11), and more precisely the branches (13, 13'), are bonded to the inner face (14) of the glazing (4) or to the shaped bead (3). However, the clip may then be more difficult to remove when necessary.

In FIGS. 6 to 10, the hold at the branches (13, 13') is provided by a pressure both against the face (14) and against the top edge of the shaped bead (3).

As can be seen in FIG. 6, an indentation (15) is made in the shaped bead (3) to allow the clip (5) to pass at the cavity (7). This indentation is not strictly indispensable because it can be imagined that the clip (5) skirts the shaped bead (3), but it is preferable to produce such an indentation particularly when the shaped bead (3) is positioned very close to the window recess of the bodywork (10).

Figure 7:
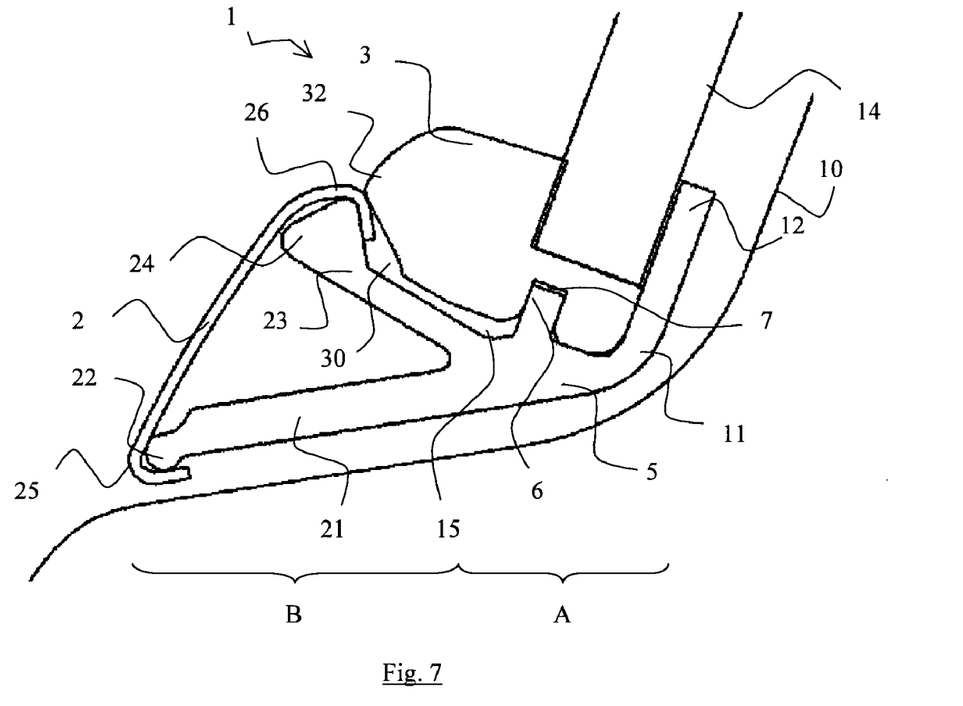
FIG. 7 illustrates a view in section along C-C' of FIG. 1 for the fifth exemplary embodiment of the invention.

Similarly, in the case of the second variant, as illustrated in FIGS. 6 and 7, an indentation (16) is made in the shaped bead (3) to allow the proximal part (11) to pass and this part to make contact with the inner face (14). This indentation is also not strictly indispensable because it can be imagined that the proximal part (11) skirts the shaped bead (3) and comes, for example, to bear thereupon without modification of its shape, but it is preferable to produce such an indentation particularly when the shaped bead (3) is positioned very close to the window recess of the bodywork (10).

This indentation (16) is also preferable when the proximal part (11) is bonded at least partly to the inner face (14) of the glazing (4) or to the shaped bead (3).

EXAMPLE 6

Figure 9:
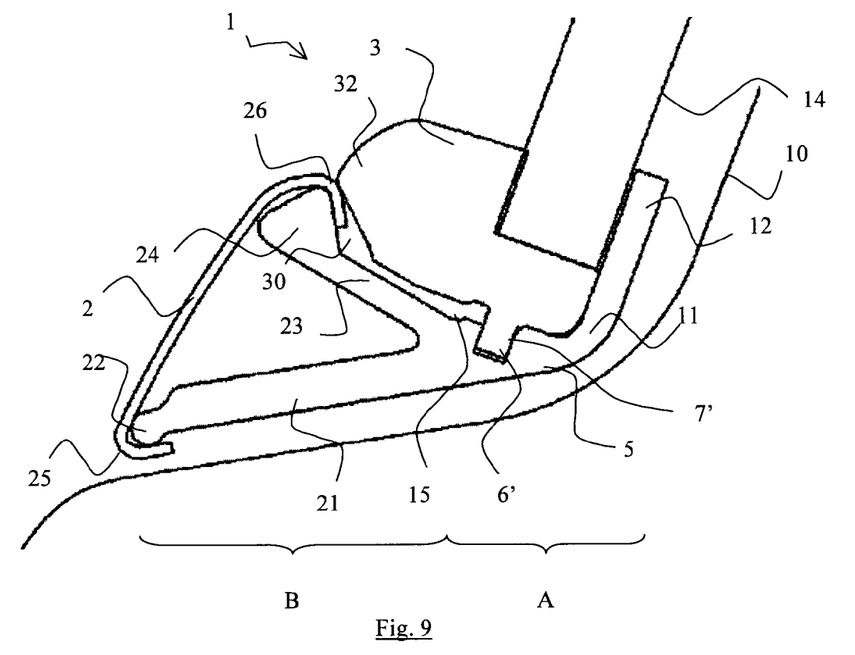
FIG. 9 illustrates a view in section along C-C' of FIG. 1 for a sixth exemplary embodiment of the invention, for the second variant embodiment, this sixth example corresponding to a subvariant with hollow female element on the clip and not open-ended and with curved proximal part.

In a subvariant of the second variant and illustrated in FIG. 9, the protruding male element (6') is situated on the shaped bead (3) and the corresponding hollow female element (7') is situated in the clip (5). Here, the hollow female element (7') forms a hole that opens onto only one face of the clip (5).

EXAMPLE 7

Figure 10:
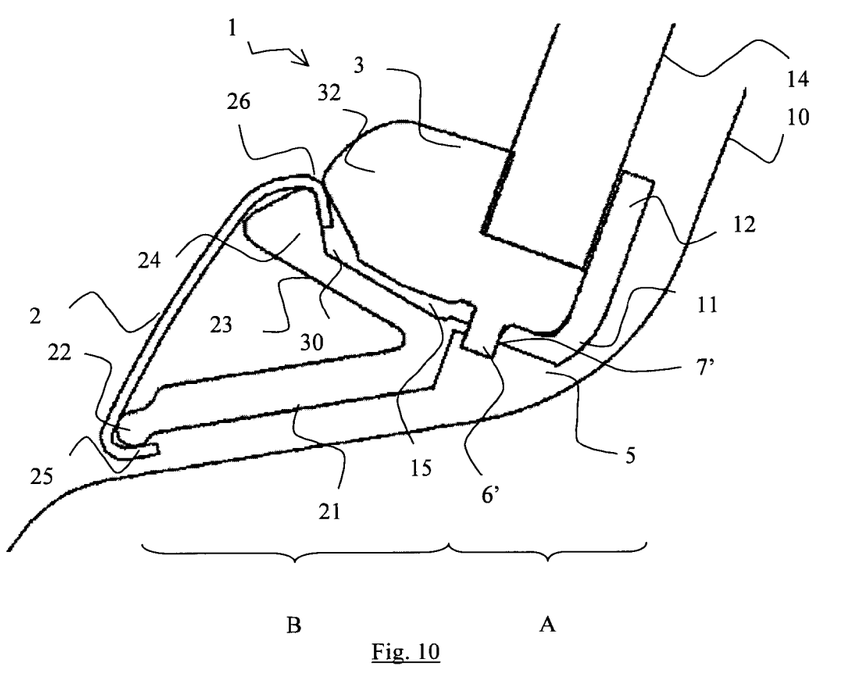
FIG. 10 illustrates a view in section along C-C' of FIG. 1 for a seventh exemplary embodiment of the invention, for the second variant embodiment, this seventh example corresponding to a subvariant with hollow female element on the clip and opening onto opposite faces of the clip and with curved proximal part.

In another subvariant of the second variant and illustrated in FIG. 10, the protruding male element (6') is also situated on the shaped bead (3) and the corresponding hollow female element (7') is situated in the clip (5), as for the preceding subvariant, but here the hollow female element (7') forms a hole opening on two opposite faces of the clip (5).

Figure 8:
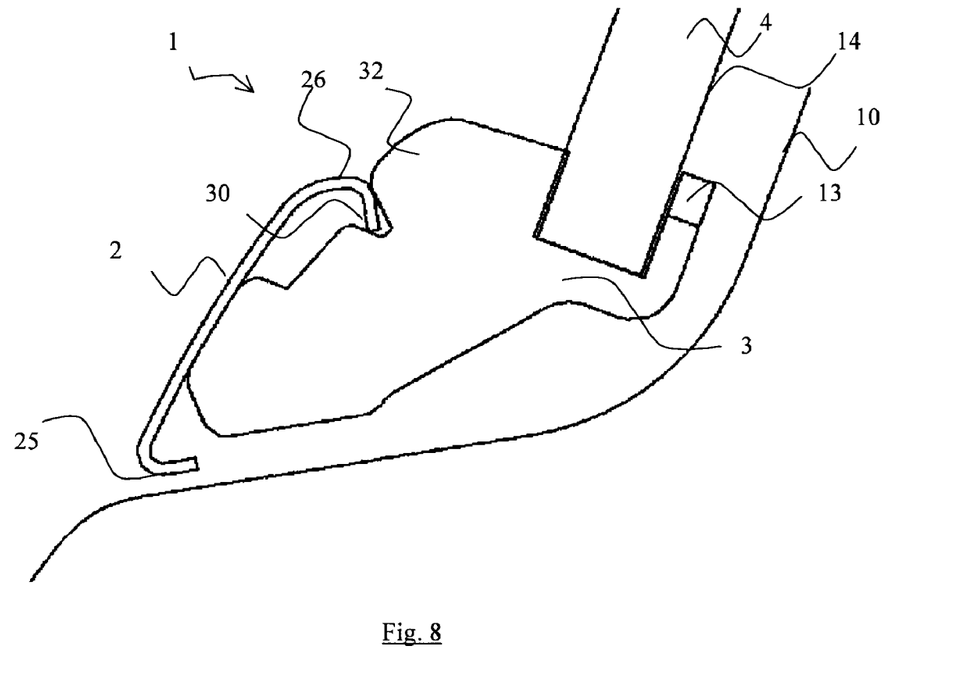
FIG. 8 illustrates a view in section along D-D' of FIG. 1 for this fifth exemplary embodiment of the invention.

The subvariants illustrated in FIGS. 9 and 10 each have a proximal part (11) identical to that of the subvariant illustrated in FIGS. 6 to 8.

In the case of a glazing for a vehicle, it is also possible to position one (or more) insert(s) in the shaped bead (3) during the molding of this shaped bead, so that the shaped bead incorporates this (or these) insert(s).

This (or these) insert(s) may be an insert or inserts:
for reinforcement, usually fully incorporated into the shaped bead (3), or
for attachment, usually prominent, for the attachment of the glazing, or
for positioning, for the correct positioning of the glazing in the window recess of the bodywork.

In the two essential variants of the invention, the internal volume of the cavity is slightly less than the external volume of the protuberance, so that the material forming the shaped bead (3) is slightly compressed and thus exerts an additional retaining force.

In all the illustrated variants and versions of the invention, the downstream interacting part B is, in side view, substantially V-shaped or Y-shaped.

As illustrated in the figures, the bottom branch (21) of the V or of the Y terminates in a rounded end (22) and the top branch (23) of the V or of the Y terminates in a triangular end (24).

As also illustrated in the figures, the rounded end (22) has a diameter that is slightly less than the thickness of the branch (21) and this rounded end (22) is not positioned in the plane of symmetry of the branch (21), but slightly offset downward.

As also illustrated in the figures, the triangular end (24) has, in section, substantially the shape of an equilateral triangle whose height is approximately three times the thickness of the branch (23) and whose base is in the extension of the bottom surface of the branch (23).

It is also possible to make this end in the form of an L and particularly an L that is inclined and formed of two faces of the illustrated triangle: the base that is in the extension of the bottom surface of the branch (23) and the wing that is adjacent to the profiled trim.

The profiled trim (2) has a bottom end (25) that is curved inward and a top end (26) also curved inward.

For the attachment of the profiled trim:
either the bottom end (25) is positioned under the rounded end (22), then the top end (24) is inserted into a slot (30) situated on the outer face of the shaped bead (3), between the triangular end (24) and a rim (32) of the shaped bead (3),
or the top end (26) is inserted into a slot (30) situated on the outer face of the shaped bead (3) between the triangular end (24) and a rim (32) of the shaped bead (3), then the bottom end (25) is positioned under the rounded end (22).

This attachment is relatively easy to achieve manually or with the aid of a robot thanks to the flexibility of the shaped bead that allows a relative movement of the rigid clip (5).

The contact of the top end (26) with the rim (32) all along the shaped bead (3) is not strictly indispensable, but it makes it possible to achieve a seal in order to prevent the ingress of liquid or solid material beneath the profiled trim. In addition, the esthetic effect obtained is agreeable.

There is no contact between the bottom end (25) and the shaped bead (3). Nor is there any contact between the bottom end (25) and the adjacent window recess of the bodywork (10), despite the proximity.

FIG. 8 illustrates a contact between the inner face of the profiled trim (2) and the adjacent shaped bead; however, this contact is not strictly indispensable.

The present invention is described in the foregoing as an example. It is understood that those skilled in the art are capable of producing various variants of the invention without, for all that, departing from the context of the patent as defined by the claims.

In particular, various shapes can still be envisaged, both for the hollow female element or elements and for the protruding male element or elements; it is in particular possible to provide a more or less developed tapering of one element and/or the other in the direction of insertion of the male element into the female element.

It is, for example, possible to produce the attachment so that several protruding male elements interact with one hollow female element or with each hollow female element.

The invention claimed is:

1. A glazing, comprising:
a shaped bead mounted on the glazing, the shaped bead provided on at least a portion with a profiled trim;
an attachment device, comprising at least one clip having at least an upstream interacting part configured to allow interaction with the shaped bead and a downstream interacting part configured to allow interaction with the profiled trim, the upstream interacting part including at least one protruding male element or one hollow female element, this element interacting respectively with a corresponding hollow female element or a protruding male element arranged in the shaped bead, the hollow female element having internal dimensions at least partially less than external dimensions of the protruding male element, wherein
the upstream interacting part further includes a curved proximal part configured to bear on an inner face of the glazing, and
an indentation is made in the shaped bead to allow the proximal part to pass and contact the inner face.

2. The glazing as claimed in claim 1, wherein the hollow female element forms a hole that opens onto only one face respectively of the shaped bead or of the clip.

3. The glazing as claimed in claim 1, wherein the hollow female element is made in the clip and forms a hole opening onto two opposite faces of the clip.

4. The glazing as claimed in claim 1, wherein the protruding male element consists of a boss having, in cross section, a trunk and a rounded end.

5. The glazing as claimed in claim 4, wherein the protruding male element has in cross section a sectional narrowing.

6. The glazing as claimed in claim 1, wherein the protruding male element has in cross section a substantially parallelepipedic shape.

7. The glazing as claimed in claim 1, wherein the curved proximal part is, in front view, substantially T-shaped.

8. The glazing as claimed in claim 1, wherein the proximal part is bonded at least in part to the inner face of the glazing or to the shaped bead.

9. The glazing as claimed in claim 1, wherein the downstream interacting part is, in side view, substantially V-shaped or Y-shaped.

10. The glazing as claimed in claim 9, wherein one branch of the V or of the Y terminates in a rounded end and an adjacent branch of the V or of the Y terminates in a triangular end or L-shaped end.

11. The glazing as claimed in claim 10, wherein the rounded end has a diameter that is less than the thickness of the branch and the rounded end is positioned offset relative to an axis of symmetry of the branch that supports the rounded end.

12. The glazing as claimed in claim 10, wherein the triangular end has, in section, substantially a shape of an equilateral triangle whose height is approximately three times the thickness of the branch that supports the triangular end.

13. The glazing as claimed in claim 1, wherein the at least one clip is made of a same material and in one piece with the profiled trim.

14. The glazing as claimed in claim 1, wherein the protruding male element or the hollow female element is arranged in the part of the shaped bead adjacent to on an edge of the glazing.

\* \* \* \* \*